US012677113B2

(12) United States Patent
Bertrand et al.

(10) Patent No.: US 12,677,113 B2
(45) Date of Patent: Jul. 7, 2026

(54) COMPUTER SYSTEM FOR DISPLAYING THE LOGISTICAL PATH OF ENTITIES OVER TIME

(71) Applicant: YOUR DATA CONSULTING, Paris (FR)

(72) Inventors: Frédéric Bertrand, Strasbourg (FR); Fabien Simon, Villiers-sur-Marne (FR); François Rosset, Paris (FR)

(73) Assignee: YOUR DATA CONSULTING, Paris (FR)

( * ) Notice: Subject to any disclaimer, the term of this patent is extended or adjusted under 35 U.S.C. 154(b) by 1319 days.

(21) Appl. No.: 16/636,157

(22) PCT Filed: Aug. 3, 2018

(86) PCT No.: PCT/FR2018/052014
§ 371 (c)(1),
(2) Date: Mar. 11, 2020

(87) PCT Pub. No.: WO2019/025744
PCT Pub. Date: Feb. 7, 2019

(65) Prior Publication Data
US 2020/0204954 A1     Jun. 25, 2020

(30) Foreign Application Priority Data

Aug. 4, 2017   (FR) ..................................... 17/57550
Feb. 21, 2018   (FR) ..................................... 18/51477

(51) Int. Cl.
G06N 5/02        (2023.01)
G06N 3/04        (2023.01)
(Continued)

(52) U.S. Cl.
CPC .............. *H04W 4/029* (2018.02); *G06N 3/04* (2013.01); *G06N 3/044* (2023.01); *G06N 3/045* (2023.01);
(Continued)

(58) Field of Classification Search
CPC .......... G06N 3/04; G06N 3/045; G06N 3/044; G06N 3/08; G06N 5/02; G06Q 10/08; H04W 4/029
See application file for complete search history.

(56) References Cited

U.S. PATENT DOCUMENTS

2008/0306783 A1* 12/2008 Yee .................... G06Q 10/0639
                                                              705/7.26
2013/0111430 A1*  5/2013 Wang .................... G06Q 10/08
                                                              717/104

(Continued)

OTHER PUBLICATIONS

Dotoli, Mariagrazia, and Maria Pia Fanti. "A coloured Petri net model for automated storage and retrieval systems serviced by rail-guided vehicles: a control perspective." International Journal of Computer Integrated Manufacturing 18.2-3 (2005): 122-136. (Year: 2005).*

(Continued)

*Primary Examiner* — Markus A. Vasquez
(74) *Attorney, Agent, or Firm* — Harness, Dickey & Pierce, PLC

(57)     ABSTRACT

A computer system displays paths based on processing of at least one series of input data including a list of time-stamped tasks. The tasks include an identifier of an object, an identifier of an action and a piece of time information. The system includes a piece of connected user computer equipment executing a display application and at least one remote server executing an application for calculating a path model from tables.

12 Claims, 9 Drawing Sheets

(51) Int. Cl.

| | |
|---|---|
| *G06N 3/044* | (2023.01) |
| *G06N 3/045* | (2023.01) |
| *G06N 3/08* | (2023.01) |
| *G06Q 10/08* | (2024.01) |
| *H04W 4/029* | (2018.01) |

(52) U.S. Cl.
CPC ................. *G06N 3/08* (2013.01); *G06N 5/02* (2013.01); *G06Q 10/08* (2013.01)

(56) References Cited

U.S. PATENT DOCUMENTS

| | | | |
|---|---|---|---|
| 2013/0218784 A1* | 8/2013 | Alonzo | .................. G06Q 10/08 705/305 |
| 2014/0214745 A1 | 7/2014 | Walsh | |
| 2017/0038919 A1* | 2/2017 | Moss | .................... G06F 3/0482 |
| 2017/0068705 A1 | 3/2017 | Rinke et al. | |
| 2018/0308019 A1* | 10/2018 | Bansal | ................... G06N 5/025 |

OTHER PUBLICATIONS

Tax Niek et al: "Predictive Business Process Monitoring with LSTM Neural Networks", May 27, 2017, International Conference on Advanced Information Systems Engineering (CAiSE) 20017, XP047415811.

M. Abadi et al: "TensorFlow: A system for large-scale machine learning", Usenix, The Advanced Computing Systems Association, Nov. 2, 2016, pp. 272-290, XP061025043.

Ilya Verenich et al., "White-box prediction of process performance indicators via flow analysis," Software and System Process, Jul. 5, 2017, pp. 85-94.

International Search Report dated Oct. 30, 2018 in corresponding PCT application No. PCT/FR2018/052014 (in English and French).

* cited by examiner

COMPUTER SYSTEM FOR DISPLAYING THE LOGISTICAL PATH OF ENTITIES OVER TIME

CROSS-REFERENCE TO RELATED APPLICATIONS

This application is a National Phase Entry of International Patent Application No. PCT/FR2018/052014, filed on Aug. 3, 2018, which claims priority to French Patent Application No. 17/57550, filed on Aug. 4, 2017 and French Patent Application No. 18/51477 filed on Feb. 21, 2018, both of which are incorporated by reference herein.

BACKGROUND AND SUMMARY

The present invention concerns the field of automatic process analysis by processing raw data consisting of a collection of descriptive information of isolated tasks, to calculate recurrent sequences, and to provide graphical representations and predictive processing.

U.S. Patent Publication No. 2017/068705 describing a computer-implemented method for the analysis of process data is known in the state of the art. The method comprises receiving an Advanced Process Algebra Execution (APE) instruction, wherein the APE instruction defines a request for process instances from the storage means, and wherein the APE instruction includes at least one process operator and executing the APE instruction and reading the process instances according to the APE instruction from the storage means, and providing the result of the request for further processing.

The proceedings of the International Conference on Advanced Information Systems Engineering (CAiSE) 2017 "Predictive Business Process Monitoring with LSTM Neural Networks", authors Niek Tax, Ilya Verenich, Marcello La Rosa, Marlon Dumas is also known. This article concerns a comparative analysis of predictive business process monitoring methods that use logs of completed tasks in a process to calculate predictions of process execution cases.

Prediction methods are tailor-made for specific prediction tasks. The article considers that the accuracy of prediction methods is very sensitive to the data set available, requiring users to trial and error and to adjust same when applying same in a specific context. This article investigates short term memory neural networks (STNs) as an approach to building accurate models for a wide range of predictive process monitoring tasks. It shows that MSTLs outperform existing techniques for predicting the next event of an ongoing case and its time-stamp. Next, how to use models to predict the next task in order to predict the complete outcome of a current case is explained.

The article TensorFlow: A System for Large-Scale Machine Learning USENIX https://www.usenix.org/conference/osdi16/technical . . . /abadi by M Abadi, Paul Barham, et al. XP061025043 is also known. U.S. patent Publication No. 2014/214745 describing a method for monitoring one or more update message(s) sent and received among components of the distributed network system is still known, the update messages comprising information associated with a state of an object on the distributed network describing the state of the object, to provide a predictive object state model and predict the occurrence of an artefact in response to the state of the object.

The solutions of the prior art are not adapted to the management of several sites, to provide for each site not only predictive information, but also a configurable graphic representation of the paths from predictive estimators common to all sites and based on common learning data. Moreover, the transposition to such a path display application for a plurality of sites would require very long computation times for data analysis from a large amount of data. Typically, for input files of several terabytes, the number of possible combinatorics may require several tens of hours of calculation on a standard computer.

Prior art solutions therefore require oversized calculation equipment to allow the user to perform the required processing. Furthermore, the analytical solutions proposed in the prior art do not allow the use of additional data to those of the process and require recalculation from the totality of the data, without the possibility of incrementally updating the result. In addition, these analytical solutions only allow the use of data that have no missing values in both process and process-additional data.

The invention is intended to overcome its disadvantages by means of a computer system allowing a large number of users to access complex models, obtained by deep learning algorithms, from simple connected equipment. For this purpose, the invention concerns, in its broadest sense, a computer system for displaying paths based on the processing of at least one series of input data comprising a list of time-stamped tasks comprising the identifier of an object, the identifier of an action and a piece of time information, said system comprising a piece of connected "user" computer equipment executing a display application and at least one remote server executing an application for calculating a path model from said tables, characterized in that said system comprises:

> an administration server, comprising means for managing a plurality of user accounts and for recording, in each user's account, tables originating from the user as well as data relating to the specific configuration of the user and the result of the processing carried out on a shared calculation server > at least one shared calculation server, comprising a GPU graphics processor for executing a deep learning application from the data associated with a user and for building a digital model subsequently recorded in said user's account on at least one of said administration or calculation servers > the user equipment executing an application for controlling the calculation, on one of said calculation servers, of an analytical or predictive state for the retrieval and display of data corresponding to the result of this calculation on the interface of the user equipment.

Advantageously, the computer system further comprises at least one CPU server for distributing the calculation load between a plurality of shared calculation servers. According to one variant, it includes means for anonymizing the identifiers of the objects and/or the identifiers of the actions of each user, and for recording means for converting the anonymized data in an encrypted form on the user's account, the data processed by the calculation server(s) exclusively consisting of anonymized data. Preferably, said encryption is carried out using a hash function.

BRIEF DESCRIPTION OF THE DRAWINGS

The present invention will be best understood upon reading the following detailed description of a non-restrictive exemplary embodiment, while referring to the appended drawings, wherein.

DETAILED DESCRIPTION

Hardware Architecture

Figure 1:
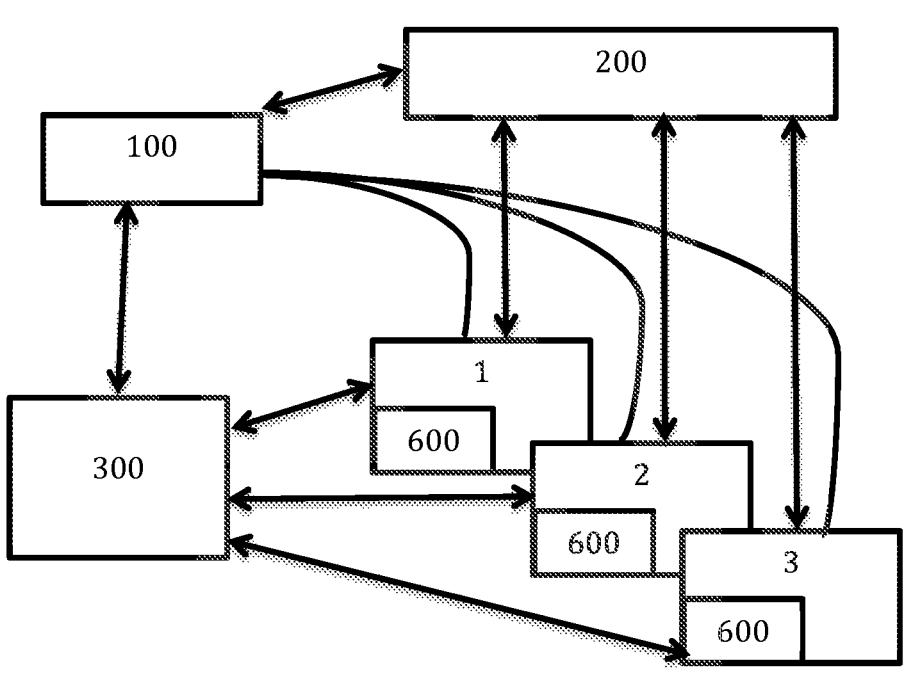
FIG. 1 shows a detailed schematic view of the hardware architecture of the system according to the invention.

The system for implementing the invention comprises three main types of resources:

connected equipment 1 to 3, for each of the users an administration server 100 a shared calculation server 200 a data recovery server 300.

Server" means a single computer machine, or a group of computer machines, or a virtual server ("cloud").

Connected Piece of Equipment

The connected piece of equipment 1 to 3 is a typically standard piece of equipment such as a cell phone, a tablet or a computer connected to a computer network, including the Internet. The invention does not require any material modification of the connected piece of equipment 1 to 3. Access to services is achieved:

either via a browser allowing communication to the administration server functionalities 100, or or by a dedicated application installed on the connected piece of equipment, to control the interactions between the connected piece of equipment and the administration server 100.

The invention makes it possible to manage a plurality of users from one or more shared administration server(s) and one or more shared calculation server(s).

Functional Architecture

Figure 2:
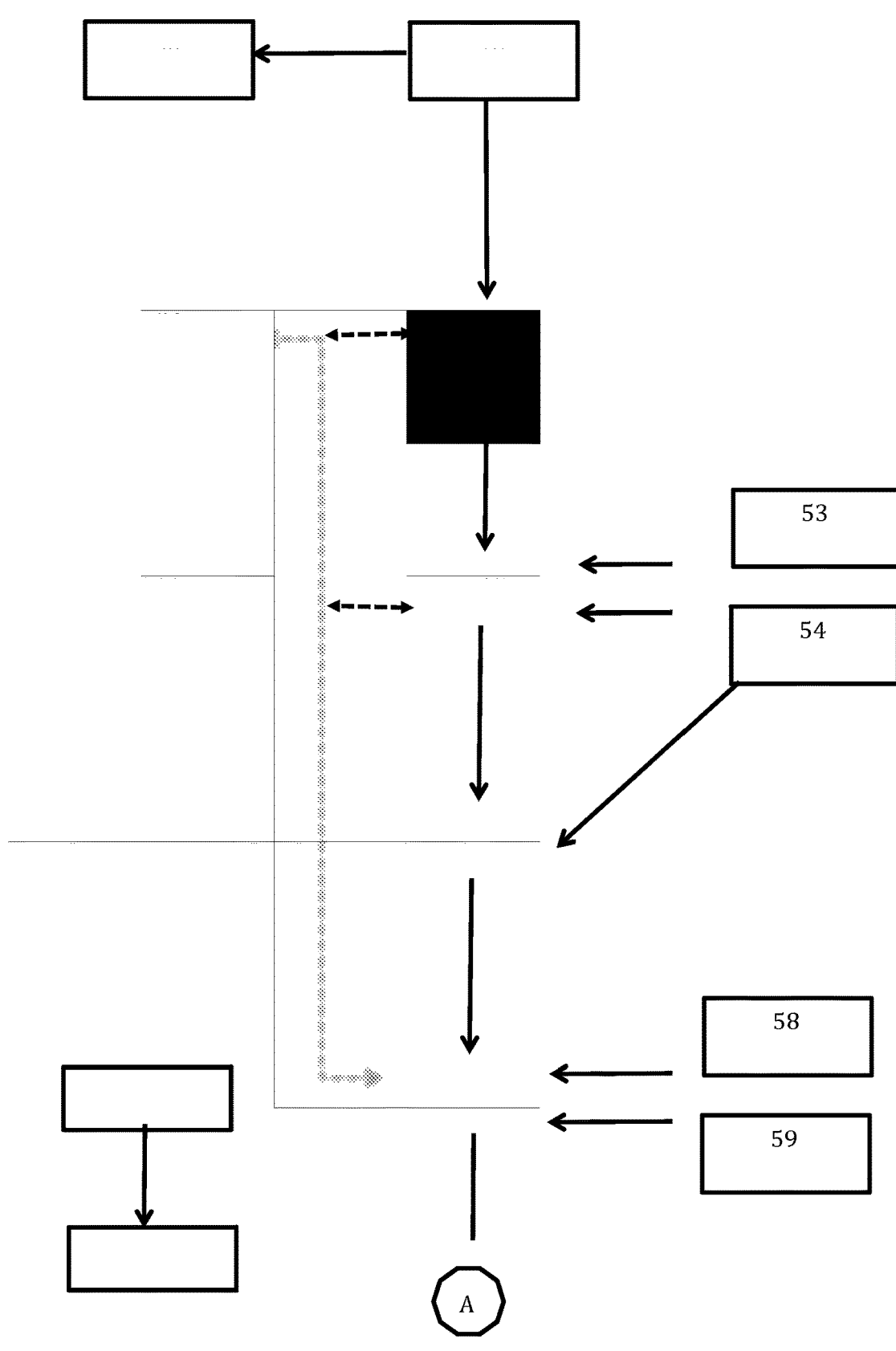
FIG. 2 shows a schematic view of the functional architecture of the preparation of data.

FIG. 2 shows a schematic view of the functional architecture. The first step is to create an account on the administration server 100. The creation of the account 10 can be performed by the managing administrator, who then provides the user with access information, including an identifier and a password and a link to the application or web page that provides access to the service.

The creation of the account 10 can also be performed by opening a session between a connected piece of equipment 1 and the administration server 100, by a session allowing to create an identifier associated with a password. An account can be associated to a plurality of paths, accessible by the same identifier.

The creation of a new account 10 also requires the allocation of a specific storage space 50 assigned to the identifier corresponding to the account. The storage space 50 allocated to an identifier is private and inaccessible to other users. Optionally, this storage space 50 is secured and accessible only by the user with the associated account, excluding access by a third party, including an administrator.

When creating the account 10, settings are also made in order to allow or disallow certain features or user preferences (e.g. message language, logo display or user interface customization). Identification can be purely declarative, or associated with a secure procedure, for example by double or triple identification.

The next step 11 consists in creating a digital configuration file 51 of a path which is translated by a name, parameters defining the structure of the tables which will be transmitted, for example:

Nature of the object to be tracked: e.g. "customer", "product", "task", . . .

Domain: e.g. "service", "industry" which will allow user interfaces to be adapted.

The next step 12 consists in recording in the dedicated storage space 50 a digital data file 52 comprising a series of time-stamped digital records. This recording can be made by transfer from the connected piece of equipment 1, or by designating the computer address where the data considered for import is recorded via a secure session controlled by the administration server 100. This functionality is achieved via a connector between the user account in the connected piece of equipment 1 and the user account on the administration server 100, as well as a third party application.

Input Data Structure 53, 54

Input data includes directly transmitted input data 53 or data 54 recorded on a remote resource which the administration server 100 can connect to. It consists of time-stamped records, such as a table, with the following structure, for example:

| ID. | Event | Start Date | End date (optional) |
|---|---|---|---|
| EA21313 | Arrival | 2017-05-26-14-25-06 | 2017-05-26-17-14-56 |

The records may also contain additional information or data in the form of character strings, names, digital values or time values such as:

event location event category descriptor a cost of the event a comment or annotation

. . .

This data can be provided by automatic processing using sensors on a site, or a log file, or the output of ERP software, or by manual input and more generally by any automatic or manual system for collecting time-stamped data relating to events. Data 54 may also be derived from connected systems, based on the analysis of the signals exchanged during a communication protocol, for example from the IMSI identifier in a GSM communication protocol, or the unique identifiers of connected objects transported in the communication protocol of the LORA type.

Recording Input Data

The input data consists of:

of input data 53 transferable to the administration server, and/or input data 54 accessible on the fly from an external resource.

The step 12 consists in adapting the format of the input data 53, 54 based on the configuration of the configuration file 51, and in recording the input data 53 in the converted form 55 on the administration server 100, the input data 54 being kept in the original form on the original resource, in order to allow on-the-fly conversion in subsequent learning steps. Adaptation consists in standardizing the data structure and possibly converting the date format to a standardized format. The conversion mode is stored so that the data transmitted can be processed at a later date.

A detailed configuration step 13 of the path is then carried out by analyzing the converted input files 54, 55 to establish a list 56 of events identified in the converted input data 54, 55. This list 56 can be associated with additional information such as the, e.g. "internal" or "external", origin of the event or a preferred sequence of events. This list 56 is also stored in the storage space of the customer in question, in the path configuration file 51.

Optionally, a step 14 of adding additional information 57 from a transferred database 58 or data that can be queried on the fly 59 is carried out, allowing data to be extracted according to the nature of the event, after conversion and standardisation where appropriate. This solution makes it possible to automate the addition of additional information 57 to the converted data 54, 55 in order to record an enriched file 60 in the configuration file 51 and to proceed to an enrichment on the fly of the file 54 according to the above-mentioned addition procedure. The on-the-fly conversion and enrichment alternative makes it possible to implement the invention in real time, whereas the alternative consisting in recording converted and enriched files on the administration server makes it possible to carry out an analysis in delayed time, in particular for uses where the input data is refreshed in delayed time.

Anonymisation of Data

Steps 12 and/or 14 may additionally involve anonymisation processing such as hashing the identifier of each event, and masking the name of the event, for example by substituting a random title for each event.

Model Generation

Figure 3:
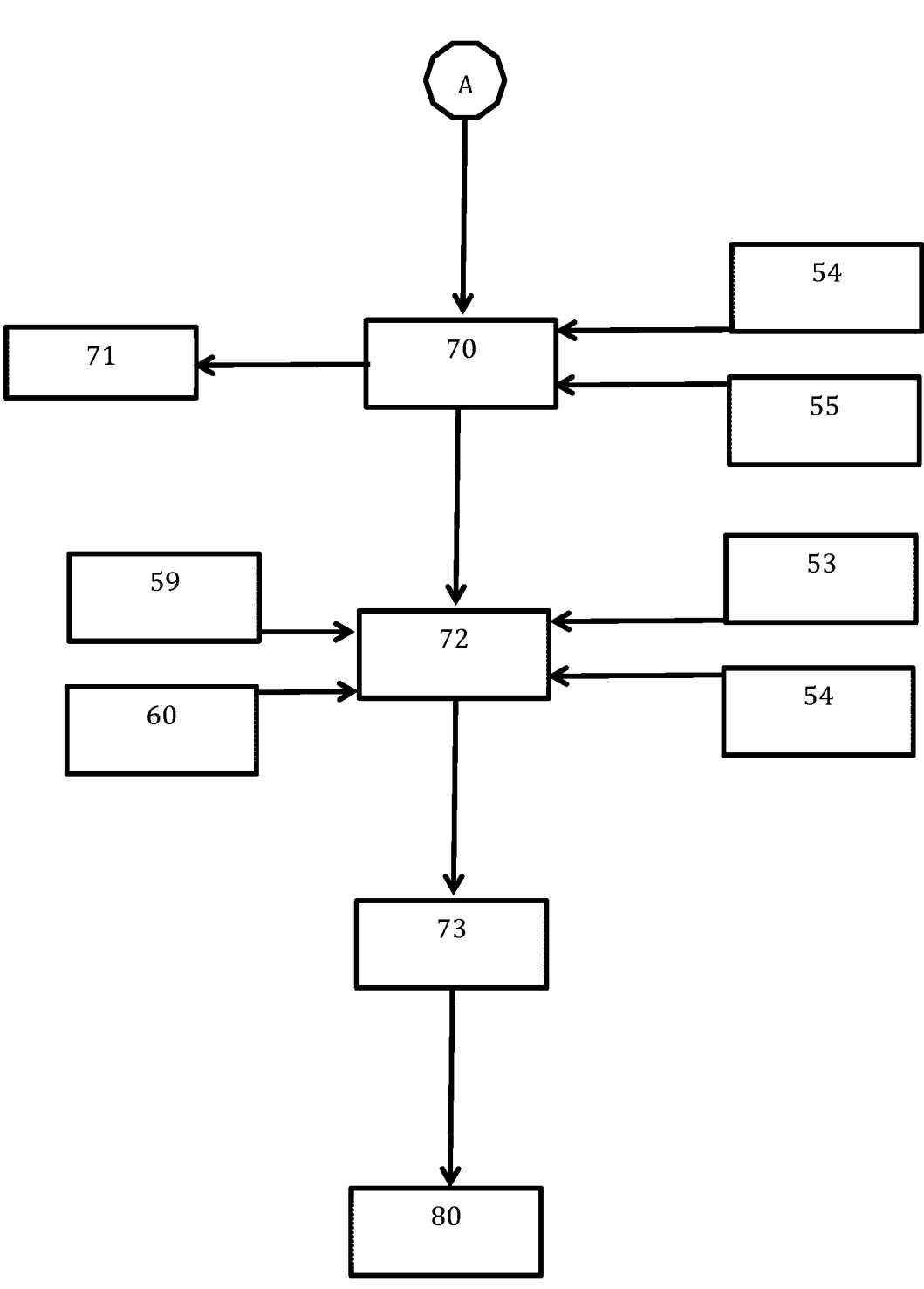
FIG. 3 shows a schematic view of the functional architecture of the exploitation of data.

FIG. 3 represents a schematic view of the functional architecture of the exploitation of data and the generation of the model. The data thus prepared is used, either in real time or in delayed time, to optionally construct a digital model 73 put into service in the form of a computer code 80.

The first step 70 of this operation consists in calculating the path graph based on the records 54, 55. This calculation is performed by identifying, for each individual, the transitions between two events based on the time-stamp information. The result is recorded in the form of a digitally oriented graph 71 the peaks of which correspond to the events, and the edges of which correspond to the transitions with the indication of the path direction. This digital graph 71 is stored in the storage space associated with the account, and the configuration file 51 is modified to take into account the information relating to the calculation of a new graph.

Given the large number of calculations to be performed, these are carried out on a shared calculation server. Indeed, the calculations concern an extremely important combinatorics, which can lead to processing requiring several hours of calculation on a usual computer. A fortiori, when the server is operated by several users each with their own account, the calculation time exceeds the capacity of a usual server.

Using a dedicated calculation server allows the administration server to control the load on the calculation server in an optimal way, and to save the digital graphs in the users' accounts asynchronously. In this case, it notifies the user of the availability of the digital network after processing has been completed. The processing can also provide quality indicators of the resulting digital graph.

The digital graph 71 is used in the displaying step 72 in conjunction with the configuration file 51 containing the list of events 56 and files 54, 55 and the additional data file 59, 60 to provide the data for a graphical application hosted on the administration server 100 for web access via a browser, or an application executed on the user's terminal 1 to 3, to provide a visual representation. This visual representation represents the flows according to the digital graph 71, with parameterization means such as filtering or adding statistical information (e.g. line thickness according to the number of occurrences), and extracting patterns corresponding to typical paths. In addition, the processing can also extract information on individuals and their paths to export them in the form of a digital table after filtering the paths as well as certain digital or graphical summaries.

Alert Creation

When the duration of certain interactions exceeds a reference value or corresponds to an extreme value for the distribution of observed values, the processing can also generate an alert in the form of an automatically generated message, for example in the form of an e-mail or SMS.

Path Prediction

In order to exploit the data for the purpose of predicting an individual's future path during the process, the user orders the creation of a model using all the historical data 54, 55 and enriched data 59, 60. As the processing of this data is very cumbersome, this processing is not carried out on the administration server 100 nor on the connected piece of equipment 1 to 3 but on a dedicated server 200 with at least one graphics card. This server 200 is shared by all users.

The processing is based on deep learning solutions with a two-level LSTM (long/short term memory) or recurrent neural networks. These are dynamic systems consisting of interconnected units (neurons) interacting non-linearly, and where there is at least one cycle in the structure. The units are connected by arcs (synapses) which have a weight. The output of a neuron is a non-linear combination of its inputs. Their behaviour can be studied using bifurcation theory, but the complexity of this study increases very rapidly with the number of neurons.

The processing is divided into two steps:

a predictive model calculation the exploitation of the predictive model.

Structure of the Neural Networks

Figure 4:
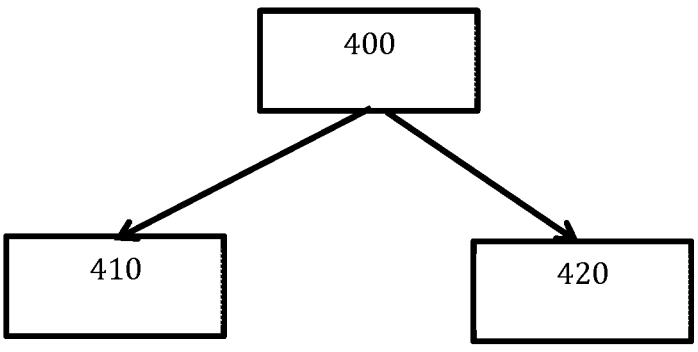
FIG. 4 shows a schematic view of a first exemplary neural network for learning purposes.

FIG. 4 shows a schematic view of a first exemplary neural network for learning purposes. In the example described, the learning uses four distinct neural networks of the LSTM (long/short term memory) type, depending on the nature of the data to be processed. The first network is made up of two layers and applies more particularly to situations where the input data contains only a single piece of time information corresponding to the beginning of each event and if the amount of additional data is limited.

The first input layer 400 of 100 neurons is common to the two networks 410, 420 of the next layer; it performs data learning to provide weighted data to the second layer which is made up of two sets 410, 420 of 100 neurons each. The first set 410 is specialized for the prediction of the following events. It provides a quality indicator corresponding to the probability of the predicted event. The second set 420 is specialized for predicting the start of the next event.

Figure 5:
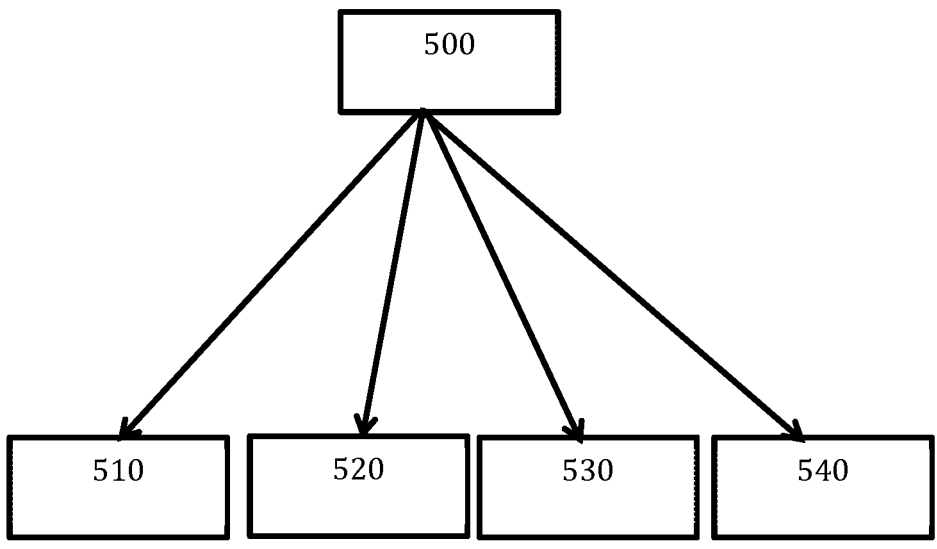
FIG. 5 shows a schematic view of a second exemplary neural networks for learning purposes.

FIG. 5 shows a schematic view of a second exemplary neural networks for learning purposes. The second network is made up of two layers of the LSTM (long/short term memory) type, and applies more particularly to situations where the input data includes two pieces of time information corresponding respectively to the beginning and the end of each event and the amount of additional data is significant. The first input layer 500 of 100 neurons is common to the four networks 510, 520, 530, 540 of the next layer and performs data learning to provide weighted data to the second layer which consists of four sets 510, 520, 530, 540 of 100 neurons each.

The first set 510 is specialized for the prediction of the following events. It provides a quality indicator corresponding to the probability of the predicted event. The second set 520 is specialized for predicting the end of the current event. The third set 530 is specialized for predicting the start of the next event. The fourth set 540 is specialized for predicting the end of the next event.

Calculation of the Predictive Model

The predictive model is computed using the KERAS library (trade name) to create an interface to the TENSOR-FLOW library (trade name) written in Python language (trade name), allowing the use of graphic cards to perform the calculations.

Use of the Predictive Model

To evaluate the models, the user orders a query with parameters that determine an existing or virtual starting point in a process. The starting point is represented by a partial path, such as an individual's current path or a typical partial path of particular interest. For the two types of neural networks mentioned above, the processing is iterated recursively, to obtain the complete path and, if necessary, the total duration and time of each new event.

In order to optimize the prediction calculation time, and to limit the exchanges between the connected piece of equipment 1 to 3 and the calculation server 200, the processing is carried out on a computer 200 with graphic cards. These solutions can be used to carry out simulations of current paths, or of new virtual cases, or to manage alerts automatically. The exploitation of the results of the prediction server installed on the calculation server 200 by the user is carried out via a Flask server (trade name) written in Python language (trade name) constituting the communication interface with the connected piece of equipment 1 to 3. This communication is carried out according to a protocol of the API REST (trade name) type.

Hardware Architecture of the Calculation Server

Figure 6:
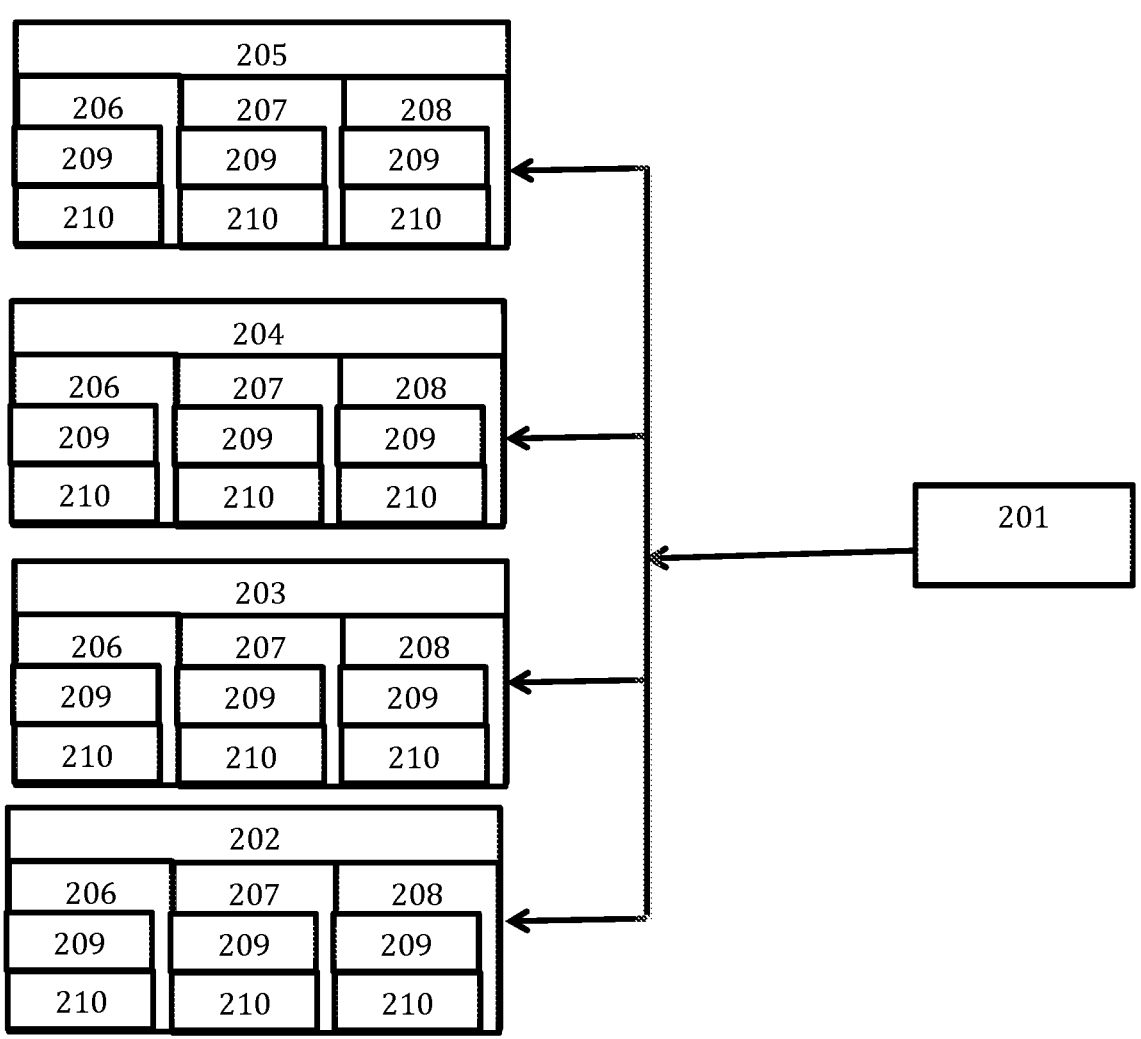
FIG. 6 shows a diagrammatic view of a calculation server.

FIG. 6 represents a diagrammatic view of a calculation server. The calculation server 200 has a hardware architecture comprising a plurality of processing units or processing cores, or multi-core (called "multi-core" architectures in Anglo-Saxon terminology), and/or multi-nodes. Examples of such hardware architectures are multi-core Central Processing Units (CPUs) or Graphics Processing Unit (GPUs) graphics cards.

A GPU graphics card includes a large number, typically hundreds, of calculation processors so the term "many-cores" or massively parallel architecture is used. Initially dedicated to calculations related to the processing of graphical data, stored in the form of two or three-dimensional arrays of pixels, GPU graphics cards are currently used more generally for any type of scientific calculation requiring high calculation power and parallel data processing. Classically, the implementation of parallel data processing on a parallel architecture is done by designing a programming application using an appropriate language allowing both task parallelism and data parallelism. OpenMP (Open Multi-Processing, trade name), OpenCL (Open Computing Language, trade name) or CUDA (Compute Unified Device Architecture, trade name) languages are examples of languages suitable for this type of application.

The server 200 comprises a server machine 201 and a set of four calculation devices 202 to 205. The server machine 201 is adapted to receive the execution instructions and to distribute the execution to the set of calculation devices 202 to 205. The calculation devices (202 to 205) of GPU graphics cards, e.g. NVIDIA Geforce GTX 1070 (trade name). The calculation devices 202 to 205 are either physically inside the server machine 201 or inside other machines, or calculation nodes, accessible either directly or via a communications network.

The calculation devices 202 to 205 are adapted to implement executable tasks transmitted by the server machine 201. Each calculation device 202 to 205 has one or more calculation unit(s) 206 to 208. Each calculation unit 206 to 208 comprises a plurality of processing units 209 to 210, or processing cores, in a "multi-core" architecture typically 1920 cores. The server machine 201 comprises at least one processor and a memory capable of storing data and instructions.

In addition, the server machine 201 is adapted to execute a computer program comprising code instructions implementing a proposed parallel data processing optimization method. For example, a program implementing the proposed parallel data processing optimization method is coded in a software programming language known as Python (trade name). A particularly suitable programming language is the TENSORFLOW library (trade name) which can be interfaced with the CUDA language (trade name) and the cuDNN library (trade name).

Hardware Architecture of the System

Figure 7:
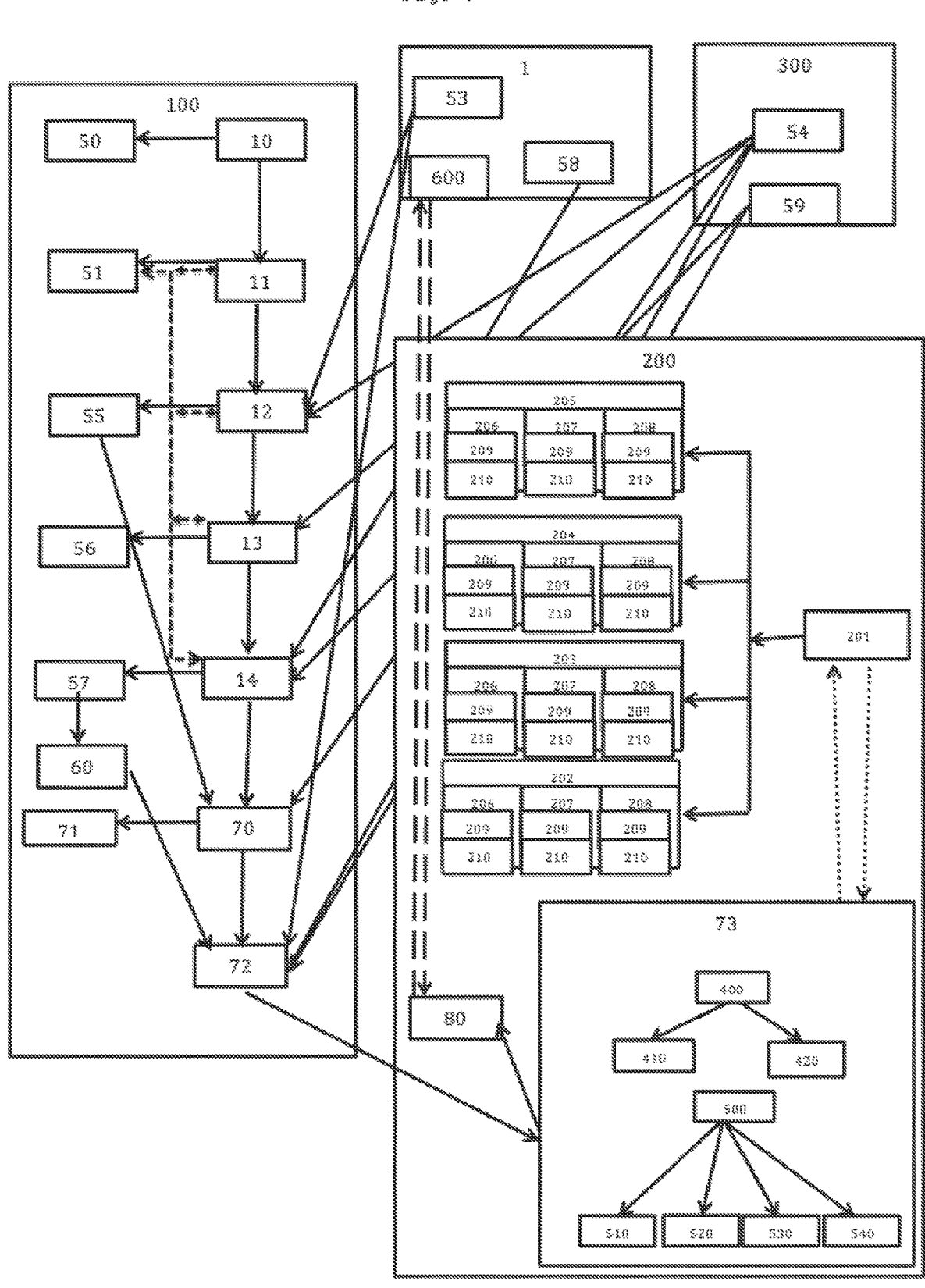
FIG. 7 shows a detailed schematic view of the hardware architecture of the system according to the invention.

FIG. 7 shows a detailed schematic view of the hardware architecture of the system according to the invention. The system comprises several servers which are common to all users, namely an administration server 100, a graphic card calculation server 200 and possibly a data acquisition server 300. As previously mentioned, each user accesses the system through a connected piece of equipment 1 to 3 communicating with the above-mentioned servers 100, 200, 300.

The administration server 100 manages each user's accounts and storage spaces, as well as the application for sending alerts. Each user has a dedicated storage space dedicated for recording:

general configuration data 50 configuration data for each of the paths 51 historical data 55 additional data 60 of the digital graph 71 for each of the paths and the quality indicators of said graph the predictive digital model 73 for each of the paths after its calculation on the calculation server 200. The administration server 100 also includes a memory for storing the computer code of the application controlling the execution of the digital graph generation either on the local computer or on a remote virtual machine.

The administration server 100 includes means for establishing a secure tunnel with the calculation server 200 for the exchange of data necessary for the calculation of a digital graph or a predictive model and more generally the exchange of data with the various computer resources. The connected pieces of equipment 1 to 3 run an application 600 directly or via a browser. This application 600 does not perform any storage on the connected piece of equipment 1 to 3, all data being stored on the administration server 200. This allows access by the user via any connected piece of equipment 1 to 3, and to secure sensitive data by avoiding permanent recording on an unsecured connected piece of equipment 1 to 3.

This application 600 communicates with the administration server 100 for:

optionally, creating an account, upon the first use thereof downloading configuration data 50 from the storage space dedicated to the user on the administration server 100 to the connected piece of equipment 1 to 3 and storing this data in random access memory without saving it in a permanent local memory downloading to the connected piece of equipment 1 to 3, path data 55, 60, from the storage space dedicated to the user on the administration server 100 or from the external resource for path data 54, 59 and recording said data in the random access memory, without recording in a permanent local memory, or a subset of this data 54, 55; 59, 60 corresponding for example to a limited time range or a given series of identifiers in the configuration phase, transmitting from the connected piece of equipment 1 to 3, locally hosted input data 55 or the link to the input data 54 hosted on an external resource retrieving from the administration server 100 the digital graph 71.

The application 600 communicates with the calculation server 200 to retrieve on the fly on the connected piece equipment 1 to 3 the result of the prediction calculation (next event, travel time, etc.) and to transmit the instructions to control the calculation of the predictive model.

Special Applications

Input data can consist of data from connected objects, such as the cell phones of passers-by in a public space, for example an airport or train station lobby, a shopping mall, an urban site, or a supermarket or a hospital. The data is picked up by beacons receiving the service signals by extracting the technical data carried by the communication protocol, e.g. IMSI identifier, time-stamp and signal strength. The system according to the invention enables the automation of displacement analysis and the prediction of displacement flows. For connected objects, the identifier analyzed is, for example, the Mac address, for WIFI or LoraWan type communications.

Determination of a Predictive Digital Model of the Evolution of an Order Preparation Process The following description concerns a particular variant, implementing a predictive model which, unlike some known predictive models, is not limited to situations where the intermediate steps are constant, with linear laws of evolution, which does not correspond to reality, but is adapted to an order preparation system comprising a plurality of intermediate stations, with sometimes complex routings of items between the stock and the order dispatching station.

Schematic Presentation of a Preparation Warehouse

Figure 8:
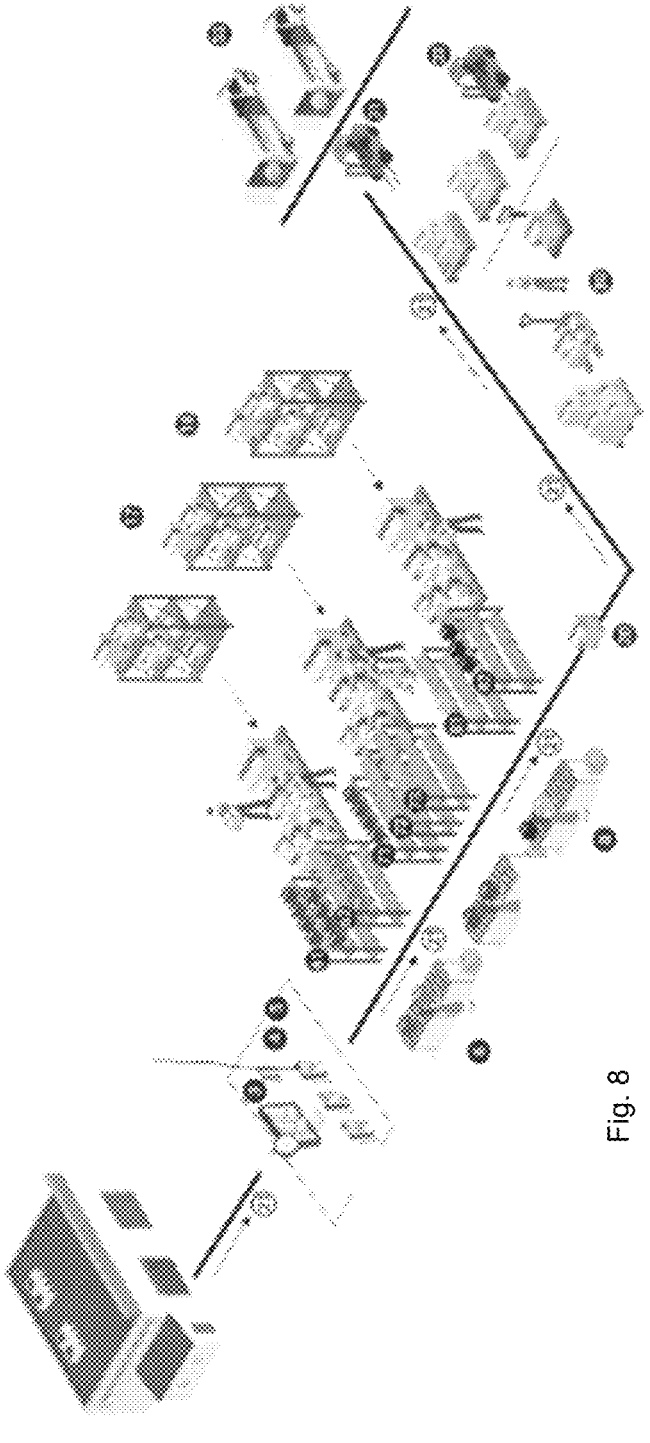
FIG. 8 shows a schematic view of an order preparation warehouse for implementing the invention.

FIG. 8 shows an example of the organisation of a warehouse for the preparation of orders for articles, from a limited number of references (a few tens to a few hundreds, for a large number of orders (a few tens of thousands), each order grouping together a few articles or a few tens of articles, corresponding to a few references, and a few articles per reference. Pursue orders arrive on a continuous-flow basis with a distribution with one or more maximums and significant variability.

The dispatch of prepared orders is carried out in batches, for example, to enable the grouping of orders according to the carrier's useful volume. These groupings are organized in parallel, for example, for loading several or dozens of zones, each corresponding to a delivery area. The general problem is the optimization of the warehouse organization and the resources allocated to reduce the time between the arrival of the pursue orders and the loading for shipment of the prepared and grouped orders, and to reduce the accumulation points, even when the forecast data is imperfect.

As an example, FIG. 8 shows an area for pursue order processing and order preparation. This area comprises technical premises 101 constituting a control station with an operator and a computer 102 connected to the information system of the article supplier. The pursue orders are received on the computer 102 connected to a printer 103 for printing, upon receipt of each order, a form comprising:

The type and the number of articles

The recipient and the shipping address of the order.

These cards 14 are placed in a basket by series of Xs, for example by series of 100 cards.

In addition, the facility has a plurality of preparation stations 106 to 108. Each preparation station 106 to 108 has N cabinets 61 to 62; 71 to 73; 81 to 82 loaded with a stock of part of the available references. In this way, all references are distributed over the N preparation stations as reference subsets, each preparation station 106 to 108 comprising $L_p$ intermediate storage cabinets of a given article reference.

Each preparation station 106 to 108 is associated with one or more cabinet reloading station(s) 106 to 108. Optionally, a reloading station 116 to 118 can be associated with several preparation stations. The operator of the preparation station 106 to 108 takes a card, identifies the articles concerning him/her, and extracts from the corresponding cupboards the articles in question, for the quantities mentioned on the card and places them in a box 120 associated with a given card. This carton 20 is then moved on a conveyor belt 21 to the next preparation station, then sent to one or more palletising station(s) 130 where several cartons destined for the same delivery area and the same conveyor are grouped together.

Alternatively, each of the cartons receives references from a single preparation station 106 to 108. The pallets are then transported by mobile trolleys 31, 32 to the loading area in trucks 33.

Digital Modelling of the Warehouse Organization and Order Flow

The path of the orders, from the pursue order to the loading area, is modelled as a graph. This graph translates as:

peaks corresponding to the processing steps, corresponding in the example to processing reception at the technical premises used as a control station 101 order preparation at the preparation stations 106 to 108 reloading of the preparation stations 106 to 108 palletizing step 30 loading of trucks 33 using trolleys 31, 32.

The arcs connecting two peaks correspond to the actual transitions between two peaks, in accordance with the usual formalism of generalized stochastic Petri nets. These arcs are equipped with laws of probability making it possible to model the transition laws. These laws of probability can be determined either from historical data or set by an operator, based on expert data or simulation assumptions. In addition, modelling includes an estimate of the distribution 40 of the pursue orders during the day, based on historical data or based on expert data or simulation assumptions.

Processing According to the Invention

A simulation is then carried out by probabilistic calculation of the propagation of the pursue orders arriving at the control station 101, to represent the evolution of the various nodes during the day, the occupancy rate of each of the nodes and the travel time of each of the pursue orders. This simulation can be carried out using a tool such as the Cosmos software (trade name) which is a "statistical model checker" published by the Ecole Normale Supérieure de Cachan (Teacher's Training College). Its input formalism is stochastic Petri nets and it evaluates formulas of the quantitative logic HASL. This logic, based on linear hybrid PLCs, allows the description of complex performance indexes related to the execution paths accepted by the PLC. This tool thus provides a means for unifying performance assessment and audit within a very general framework.

Iterations of this simulation are then run several tens of thousands of times to obtain a convergence of the estimate of each of these results, and in particular:

the average number of pursue orders in the local queue of each of the processing stations, and its evolution over time the cumulative processing time for all pursue orders.

Figure 9:
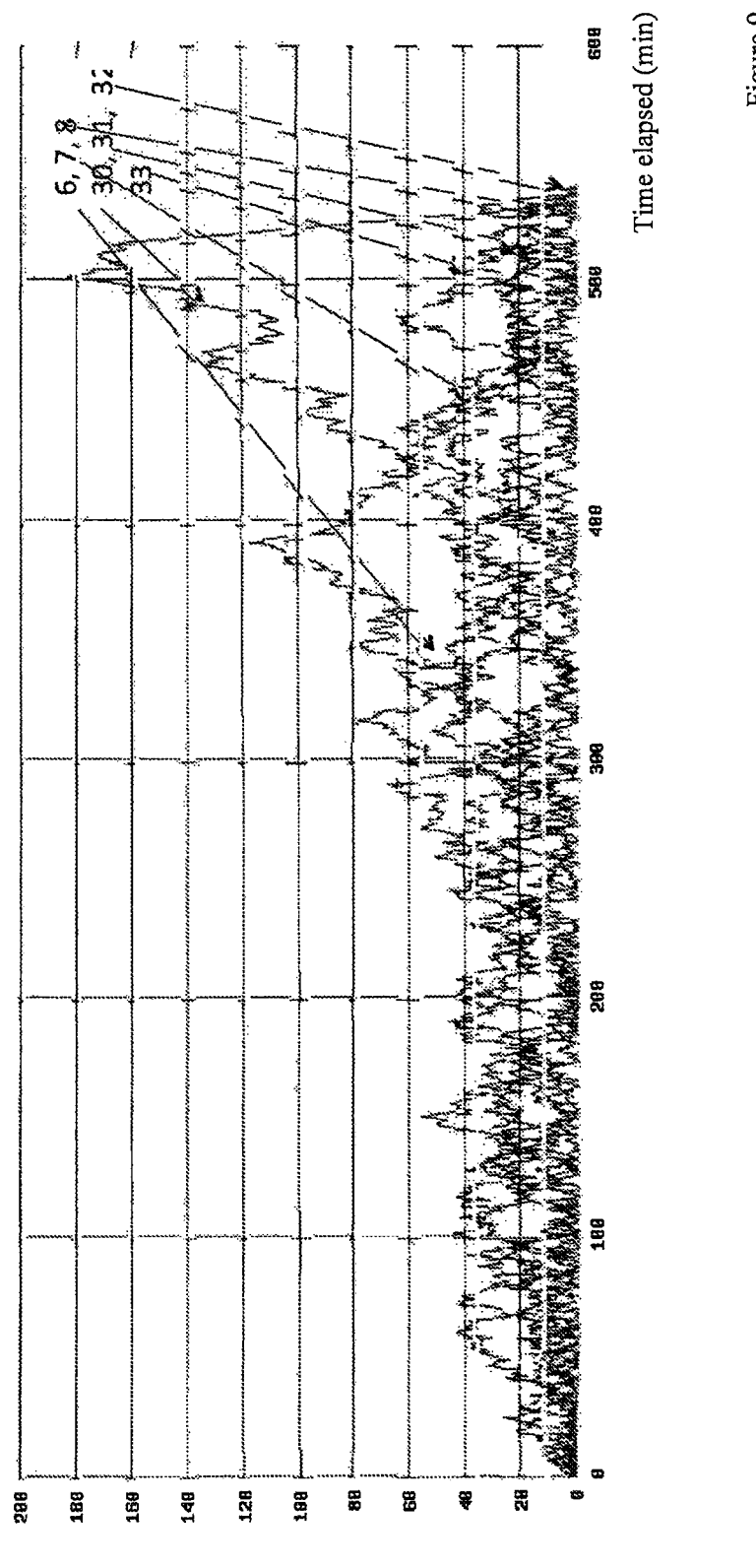
FIG. 9 is a plot of the average number of pursue orders in the local queue of each of the processing stations, and its evolution over time.

This cumulative time is calculated using hybrid automaton stochastic logic (HASL) applied to the above-mentioned modelling system. The result provided by the Cosmos tool (trade name) is a data file describing the evolution over time of the graph, and in particular the temporal evolution of the number of orders in the queue of each of the stations. This calculation can be visualized by a curve shown in FIG. 9.

Figure 10:
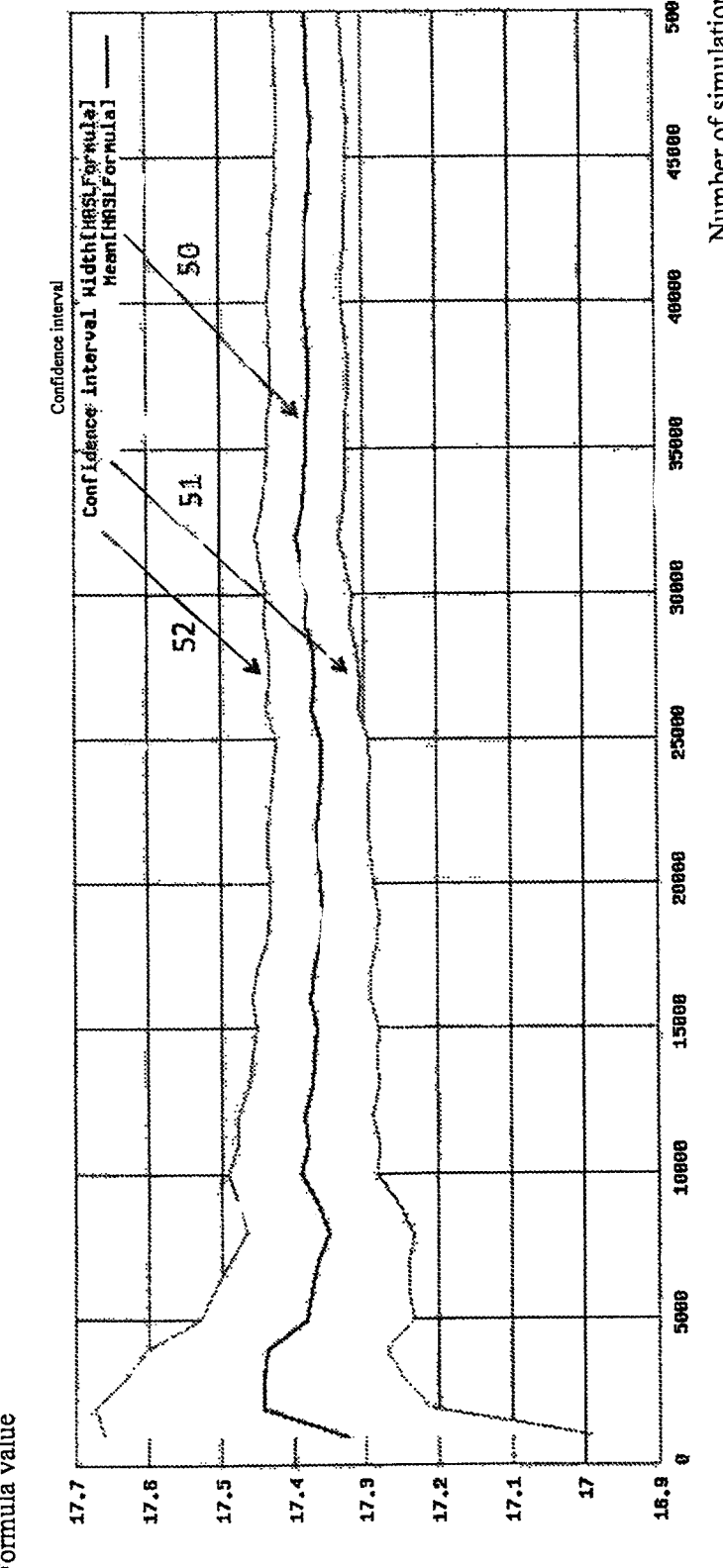
FIG. 10 is a plot of an example of the representation of the mean value of the cumulative processing time (curve 50) and 99% confidence intervals.

Iterations of this processing provide information on the distribution of network parameters, including the number of pending pursue orders, the cumulative processing time of all pursue orders, and the travel time of each pursue order. FIG. 10 shows an example of the representation of the mean value of the cumulative processing time (curve 50) and 99% confidence intervals (curve 51, 52).

Use of this Information

These results make it possible to determine whether a time threshold value accumulated over a predetermined period of time (one day for example or an interval of N hours) has been exceeded. If risks of time expiry are identified, the operator can either modify his/her constraints and/or commitment towards the payer, or modify the resources allocated to one or more station(s), and carry out a new simulation to check whether this modification leads to the threshold value being no longer exceeded. They also allow the organization to be redefined and a new simulation to be carried out to determine the impact on key parameters. They also make it possible to organize reports over a subsequent period of time, for example, plus the processing of part of the pursue orders the next day.

The overall objective of the invention is to optimize the physical organization of an order processing warehouse in order to anticipate situations preventing compliance with constraints relating to the processing time of pursue orders, the future flow of which is known only in an approximate manner, and in particular to make the allocation of future resources evolve in an optimal manner, in quasi-real time. Historical data is recorded in the form of time-stamped log files, based on the data provided by each workstation. This information may optionally include operator identifiers in order to improve the relevance of the simulations by taking into account the operators present at each workstation and optimise composition of the teams according to the defined objectives.

In particular, the invention makes it possible to carry out processing without requiring means for collecting data on each of the workstations. Thus, the invention is applicable to organizations based on manual operators using paper sheets, on workstations without equipment for real-time information capture and/or traceability.

Processing Missing Data

When data is incomplete, the invention provides a solution consisting in creating an imputation server using deep learning techniques, typically the self-encoding techniques known as "variational auto-encoders". An auto-encoder, or auto-associator, is a network of artificial neurons used for unsupervised learning of discriminating characteristics. The purpose of an auto-encoder is to learn a representation (encoding) of a set of data, usually with the aim of reducing the size of the set. The auto-encoder concept is used for learning generative models. The advantages compared to the techniques usually used as MICE, multivariate imputation by chained equations are:

Continuous and timely update of the imputation model with the arrival of new data.

It reduces the imputation time as soon as the model is fitted and offers the possibility of performing multiple imputation quickly to evaluate the uncertainty due to the presence of missing values, thus providing a confidence indicator for predictions that incorporates the presence of the missing values.

The invention claimed is:

1. A computer system for displaying paths based on processing of at least one series of input data comprising:

an administration server;

a plurality of user equipment in communication with the administration server each having a user identifier;

a memory associated with the administration server having allocated storage space assigned to each user identifier corresponding to the account of the user connected equipment that is inaccessible to other user devices, the memory having a list of time-stamped tasks comprising an identifier of an object, an identifier of an action and a piece of time information;

the plurality of user computer equipment, each configured to execute a display application, each of the plurality of user computer equipment associated with different sites and learning data;

at least one remote server configured to execute an application for calculating a path model from tables stored in the allocated storage originating from a plurality of user accounts on the at least one server;

the administration server separate from the at least one remote server configured to manage a plurality of user accounts and configured to record, in each user account of the plurality of user accounts, the tables as well as data relating to a specific configuration associated with each user account and a result of processing carried out on a shared calculation server;

at least one shared calculation server, separated from, the plurality of user equipment, the administration server and the remote server comprising a GPU graphics processor configured to execute a deep learning application from data associated with a user account and building a digital model subsequently recorded in a user account of the plurality of user accounts on at least one of the administration server and the at least one shared calculation server by using a calculation that uses learning data common to all sites to form a path graph in a shared calculation server, said path graph comprising peaks corresponding to events and edges corresponding to transitions with an indication of path direction;

the plurality of user equipment configured to execute an application controlling the calculation, on one of the at least one shared calculation server, of an analytical or predictive state for retrieval of data corresponding to a result of the calculation;

the administration server configured to update the configuration file associated with the user identifier based on the path graph and store the path graph in the storage associated with the user identifier of the user associated equipment; and a display associated with at least one of the plurality of user equipment configured to display the path graph as the result of the calculation in the path model.

2. The computer system according to claim 1, further comprising at least one CPU server distributing the calculation load between a plurality of shared calculation servers.

3. The computer system according to claim 1, further comprising anonymising the identifiers of the objects and/or the identifiers of the actions of each user, and a recorder converting the anonymised data in an encrypted form on the user's account, the data processed by the calculation server(s) exclusively consisting of anonymised data.

4. The computer system according to claim 3, wherein the encryption is carried out using a hash function.

5. An automatic method for displaying paths from at least one series of input data comprising a list of time-stamped tasks comprising an identifier of an object, the identifier of an action and a piece of time information, comprising:

calculating a path model from tables originating from a plurality of user accounts on a server;

controlling, on each of a plurality of user computer equipment, a calculation, on a shared calculation server, of an analytical or predictive state for retrieval and display of data corresponding to a result of the calculation on an interface of one of the plurality user equipment and a display application, each of the plurality of user computer equipment associated with different sites and learning data;

managing, on an administration server, the plurality of user accounts and recording, in each user account, the tables, data relating to a specific configuration of the user and a result of processing carried out on the shared calculation server;

constructing, on the shared calculation server, separated from the administration server and the plurality of user equipment, comprising a GPU graphics processor for deep learning from data associated with a user site and learning data common to all sites, a digital model subsequently recorded in a user account of the plurality of user accounts on at least one of the administration server or the shared calculation server by using learning data common to all sites to form a path graph in a shared calculation server, said path graph comprising peaks corresponding to events and edges corresponding to transitions with an indication of path direction;

updating, at the administration server, the configuration file associated with the user identifier based on the path graph and storing the path graph in the storage associated with the user identifier of the user associated equipment; and displaying the path graph as a result of the calculation in the path model on a display associated with at least one of the plurality of user equipment.

6. The automatic method for displaying paths according to claim 5, further comprising determining a digital model predictive of an evolution of an order preparation process, comprising:

calculating, for each of future orders ($C_i$ ($P_j$, t)), time t of passage of each of orders $C_i$ at each of $P_j$ order picking stations of a logistics warehouse;

after calculating time t, calculating, for each of time slots $At_x$ and for each of the order picking stations $P_j$, the number Nx of orders $C_i$;

applying a Petri nets model to all the stations $P_j$, each of the orders $C_i$ being represented by a digital token $JN_i$, according to injection hypotheses of the tokens and the model representing the processing carried out for preparation of the orders; and after applying the Petri nets model, implementing a linear hybrid automaton system to determine parameters of predictive digital model representative of a future state of an order processing chain.

7. The automatic method for displaying paths according to claim 6, wherein the display application controls a dynamic display of an evolution of the digital tokens according to the predictive digital model.

8. The automatic method for displaying paths according to claim 6, further comprising determining at least one parameter of the order preparation at the shared calculation server.

9. An automatic method for displaying paths from at least one series of input data comprising a list of time-stamped tasks comprising an identifier of an object, the identifier of an action and a piece of time information, comprising:

calculating a path model from tables originating from a plurality of user accounts on a server;

controlling, on each of a plurality of user computer equipment, a calculation, on a shared calculation server, of an analytical or predictive state for retrieval and display of data corresponding to a result of the calculation on an interface of one of the plurality user equipment and a display application;

managing, on an administration server, the plurality of user accounts and recording, in each user account, the tables, data relating to a specific configuration of the user and a result of processing carried out on the shared calculation server; and constructing, on the shared calculation server, separated from the administration server and the plurality of user equipment, comprising a GPU graphics processor for deep learning from data associated with a user site and learning data common to all sites, a digital model subsequently recorded in a user account of the plurality of user accounts on at least one of the administration server or the shared calculation server to form a path graph in a shared calculation server, said path graph comprising peaks corresponding to events and edges corresponding to transitions with an indication of path direction;

updating, at the administration server, the configuration file associated with the user identifier based on the path graph and storing the path graph in the storage associated with the user identifier of the user associated equipment;

displaying a result of the calculation in the path model on a display associated with at least one of the plurality of user equipment;

determining a digital model predictive of an evolution of an order preparation process;

calculating, for each of future orders ($C_i$ ($P_j$, t)), time t of passage of each of orders $C_i$ at each of $P_j$ order picking stations of a logistics warehouse;

after calculating time t, calculating, for each of time slots $At_x$ and for each of the order picking stations $P_j$, the number Nx of orders $C_i$;

applying a Petri nets model to all the stations $P_j$, each of the orders $C_i$ being represented by a digital token $JN_i$, according to injection hypotheses of the tokens and the model representing the processing carried out for preparation of the orders; and after applying the Petri nets model, implementing a linear hybrid automaton system to determine parameters of predictive digital model representative of a future state of an order processing chain; and displaying the display application controls a dynamic display of an evolution of the digital tokens according to the predictive digital model.

10. A method comprising;

creating an account on an administrative server associated with each of a plurality of user connected equipment, each of the plurality of user connected equipment associated with a respective user identifier;

allocating storage space of the administrative server assigned to the user identifier corresponding to the account of the user connected equipment that is inaccessible to other user devices;

communicating to the plurality of user connected equipment access data for accessing the administrative server;

communicating the access data to the plurality of user connected equipment;

communicating time-stamped digital records to the allocated storage space from a remote server or the user connected equipment associated with an account, the time-stamped digital records comprising an event location and an event category descriptor;

storing in the allocated storage space data the time-stamped digital records;

creating a digital configuration file the path of which is translated by a name and parameters defining a structure to be transmitted;

formatting at the administrative server the time-stamped digital data based on the configuration file to form converted data;

storing the converted data in the administrative server;

determining the path data from the converted data comprising a list of events corresponding to the path, an origin of the event and a preferred sequence;

storing the list of events in the storge associated with the user identifier of the user associated equipment;

generating, in a shared calculation server, a path graph from the path data comprising transitions between two events from the list of events based on the timestamps, said path graph comprising peaks corresponding to events and edges corresponding to transitions with an indication of path direction;

updating the configuration file associated with the user identifier based on the path graph;

storing the path graph in the storage associated with the user identifier of the user associated equipment; and displaying the path graph.

11. The method of claim 10 further comprising obtaining on-the fly data and updating the converted data to form an enriched file to obtain updated display data in real time.

12. The method of claim 11 further comprising determining generating a model based on historical data and the enriched file and determining a future path based on the model.

* * * * *